United States Patent
Berens

(10) Patent No.: US 8,036,159 B2
(45) Date of Patent: Oct. 11, 2011

(54) METHOD OF MANAGING THE OPERATION OF A WIRELESS COMMUNICATION DEVICE AND CORRESPONDING WIRELESS DEVICE

(75) Inventor: Friedbert Berens, Geneva (CH)

(73) Assignee: STMicroelectronics N.V., Amsterdam (NL)

( * ) Notice: Subject to any disclaimer, the term of this patent is extended or adjusted under 35 U.S.C. 154(b) by 786 days.

(21) Appl. No.: 12/018,467

(22) Filed: Jan. 23, 2008

(65) Prior Publication Data

US 2008/0240271 A1 Oct. 2, 2008

(30) Foreign Application Priority Data

Mar. 28, 2007 (EP) .................................. 07105140

(51) Int. Cl.
*H04B 7/185* (2006.01)
*H04L 5/12* (2006.01)
*H04Q 7/00* (2006.01)

(52) U.S. Cl. ........ 370/328; 370/335; 375/261; 375/298; 455/67.13

(58) Field of Classification Search .......... 370/318–329, 370/332–335, 342; 455/67.1, 440, 423, 522, 455/456.1; 375/130, 146, 219, 259, 261, 375/267, 298, 299, 308, 349
See application file for complete search history.

(56) References Cited

U.S. PATENT DOCUMENTS

| | | | |
|---|---|---|---|
| 6,445,749 B2 * | 9/2002 | Feher | 375/298 |
| 6,560,463 B1 * | 5/2003 | Santhoff | 455/522 |
| 7,089,033 B2 * | 8/2006 | Leinonen et al. | 455/553.1 |
| 7,653,020 B2 * | 1/2010 | Roberts | 370/318 |
| 7,769,386 B2 * | 8/2010 | Feher | 455/440 |
| 2005/0164642 A1 | 7/2005 | Roberts | 455/67.13 |
| 2005/0255878 A1 | 11/2005 | Leinonen et al. | 455/552.1 |

OTHER PUBLICATIONS

"Detect and Avoid (DAA) Techniques—Enabler for Worldwide Ultrawideband Regulations", Shetty et al., Apr. 20, 2006, Institution of Engineering and Technology Seminar, London, UK, XP-002445528, pp. 21-29.

* cited by examiner

*Primary Examiner* — Afsar M. Qureshi
(74) *Attorney, Agent, or Firm* — Lisa K. Jorgenson; Allen, Dyer, Doppelt, Milbrath & Gilchrist, P.A.

(57) ABSTRACT

The method is for managing the operation of a wireless communication device including several different communication modules respectively adapted to operate according to several given communication protocols including a UWB module operating according to a UWB protocol based on an OFDM modulation scheme. The method includes controlling the UWB module for scanning a chosen frequency band, and managing a communication to be performed by the device on the basis of the scanning result.

22 Claims, 4 Drawing Sheets

METHOD OF MANAGING THE OPERATION OF A WIRELESS COMMUNICATION DEVICE AND CORRESPONDING WIRELESS DEVICE

FIELD OF THE INVENTION

The invention relates to the wireless communication systems.

BACKGROUND OF THE INVENTION

Today's wireless systems are mainly based on a fixed frequency allocation to a specific service. For example, the band around 900 MHz and around 1800 MHz are exclusively reserved for the use of Global System for Mobile (GSM). Other bands are reserved for other kinds of wireless communication and navigation systems.

Among the other types of wireless systems, for example, are those using mobile radio standards such as GSM, Universal Mobile Telecommunications System (UMTS), code-division multiple access-2000 (CDMA2000), Wideband Code Division Multiple Access (WCDMA), Enhanced Data rates for GSM Evolution (EDGE); Multi-Carrier Code Division Multiple Access (MC-CDMA), and non coordinated communication systems such as WLAN (Wireless Local Area Network) or WPAN (Wireless Personal Area Network) adapted to work for example according to a UWB (Ultra Wide Band) technology. Also, WIMAX devices (Worldwide Interoperability for Microwave Access) are fixed wireless devices, operating for example with a bandwidth of 20 MHz at a central frequency of 3.5 GHz. The co-location within the same device of different communication modules adapted to operate according to different communication protocols or standards, has been already contemplated.

However, in such existing systems, the normal receiver circuitry or means are used for performing a spectrum sensing. In other words, each communication module is sequentially switched into a scanning mode and can then get an idea of the frequency allocation in its surrounding. However, this sequential scanning is in general slow and thus very time consuming. Furthermore, the time resolution of this conventional method is limited due to the limited sampling time of the used systems.

There is a need to scan a complete frequency band of interest in a single operation without changing the operational mode of the wireless device. There is also a need to improve the resolution of the spectrum analyzing.

SUMMARY OF THE INVENTION

According to one aspect, a method is provided for managing the operation of a wireless communication device including several different communication modules respectively adapted to operate according to several given communications protocols or standards including a UWB protocol based on an Orthogonal Frequency Division Multiplexing (OFDM) modulation scheme. The method comprises controlling the UWB module for scanning a chosen frequency band, and managing a communication to be performed by the device on the basis of the scanning result.

By deploying a separate low cost OFDM based UWB module, the device according to such an embodiment can scan the complete frequency band of interest in one shot without changing the operation operational mode of the device. Thus, the scanning process can be performed for example when the device is in a reception phase, whatever the module being used for the communication.

Further, since a UWB module is a broad band module, the complete band can be scanned in parallel with a resolution which is equal to the sub-carrier bandwidth of the OFDM based UWB system. Further, the sensitivity can be for example increased by averaging over more than one sample. This very high time resolution can be used for example to identify characteristic time patterns of the different communication protocols to be observed.

In other words, according to this aspect, further to its normal communication function, the OFDM based UWB module is used here for performing a scanning function which permits to scan the complete frequency band of interest in one shot thus avoiding a sequential scanning performed successively by all the communication modules of the device. The scan may be performed after the device is switched on.

The scan may be also performed for example during a silence period of the communication protocol associated to a communication module being used for performing the communication. The scan may be also performed for example during a reception phase of the communication protocol associated to a communication module being used for performing the communication.

The managing step comprises for example selecting one of the modules for performing the communication. The managing step may also comprise elaborating operation management information from the scanning result and from reference information related to the communication protocols respectively associated to the modules included in the devices and managing the operation of the module being used for the communication by using the operation management information.

According to another aspect, a wireless device is provided comprising several different communication modules respectively adapted to operate according to several given communication protocols including an UWB protocol based on OFDM modulation scheme, a controller or means adapted to control the OFDM based UWB module for scanning a chosen frequency band, and a management unit or means adapted to manage a communication to be performed by the device on the basis of the scanning result.

According to an embodiment, the controller is adapted to control the UWB module for performing the scan after the device is switched on. According to another embodiment, the controller is adapted to control the UWB module for performing the scan during silence periods of the communication protocol associated to a communication module being used for performing the communications.

According to another embodiment, the controller is adapted to control the UWB module for performing the scan during a reception phase of the communication protocol associated to a communication module being used for performing the communication. According to an embodiment, the management unit comprises a selection block or means adapted to select one of the modules for performing the communication.

According to another embodiment, the wireless device further comprises a memory or means adapted to store reference information related to the communication protocols respectively associated to the modules included in the device, and the management unit comprises a comparison unit or means adapted to compare the scanning result with the reference information and a management controller adapted to manage the communication on the basis of the comparison result.

According to an embodiment, the UWB module comprises a front end stage, and first means coupled to the front end stage and adapted to perform a Fast Fourier Transform. The device further comprises second means controllably coupled to the outputs of the first means and adapted to deliver energy information respectively associated to the frequencies respectively corresponding to the outputs of the first means, and the control means are adapted to activate the second means.

According to another embodiment, the front end stage comprises frequency transposition means and a controllable local oscillator adapted to deliver a transposition signal having a transposition frequency to the transposition means. The controller is adapted to control the local oscillator for modifying the transposition frequency in accordance with the chosen frequency band to be scanned.

BRIEF DESCRIPTION OF THE DRAWINGS

Other advantages and features of the invention will appear on examining the detailed description of non-limiting embodiments, and of the appended drawings in which.

DETAILED DESCRIPTION OF THE PREFERRED EMBODIMENTS

Figure 4:
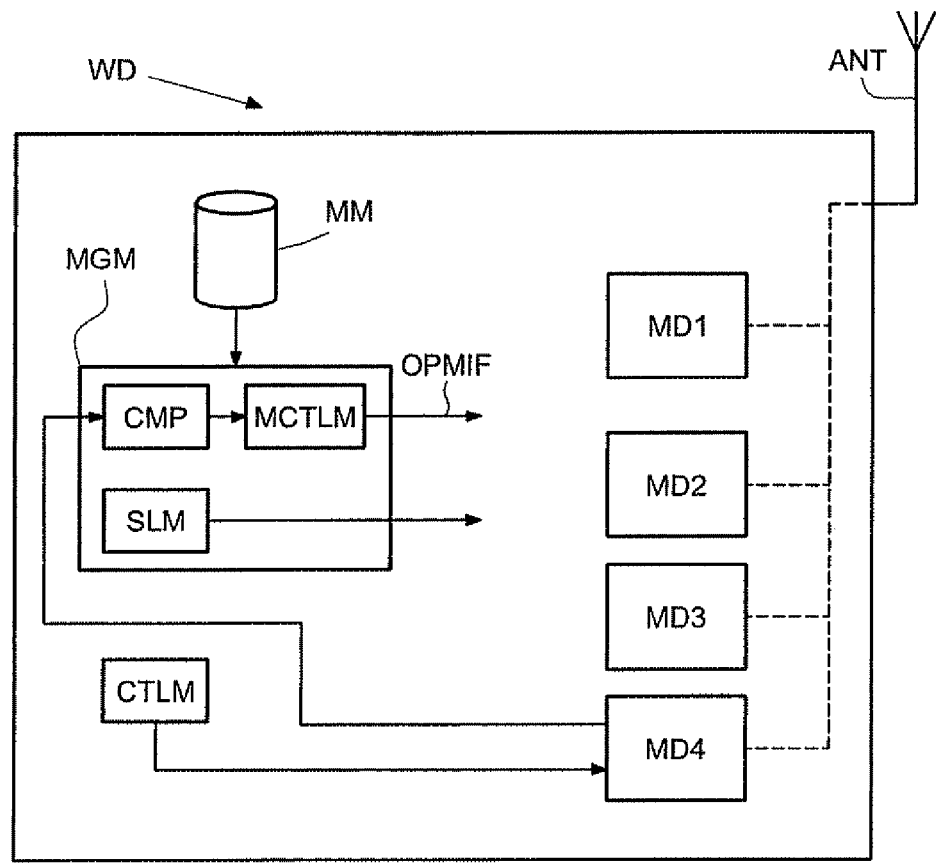
FIGS. 4 and 5 are schematic block diagrams illustrating embodiments of a wireless device including several different communication modules.

As illustrated in FIG. 4, a wireless device WD is provided with several different communication modules MD1-MD4 connected to an antenna ANT. Each communication module is adapted to operate according to a given communication protocol or standard, and is provided accordingly with a corresponding conventional structure known per se. For example, module MD1 is a GSM module, module MD2 is an UMTS module, module MD3 is a WIMAX module, and module MD4 is an OFDM based UWB module.

Figure 1:
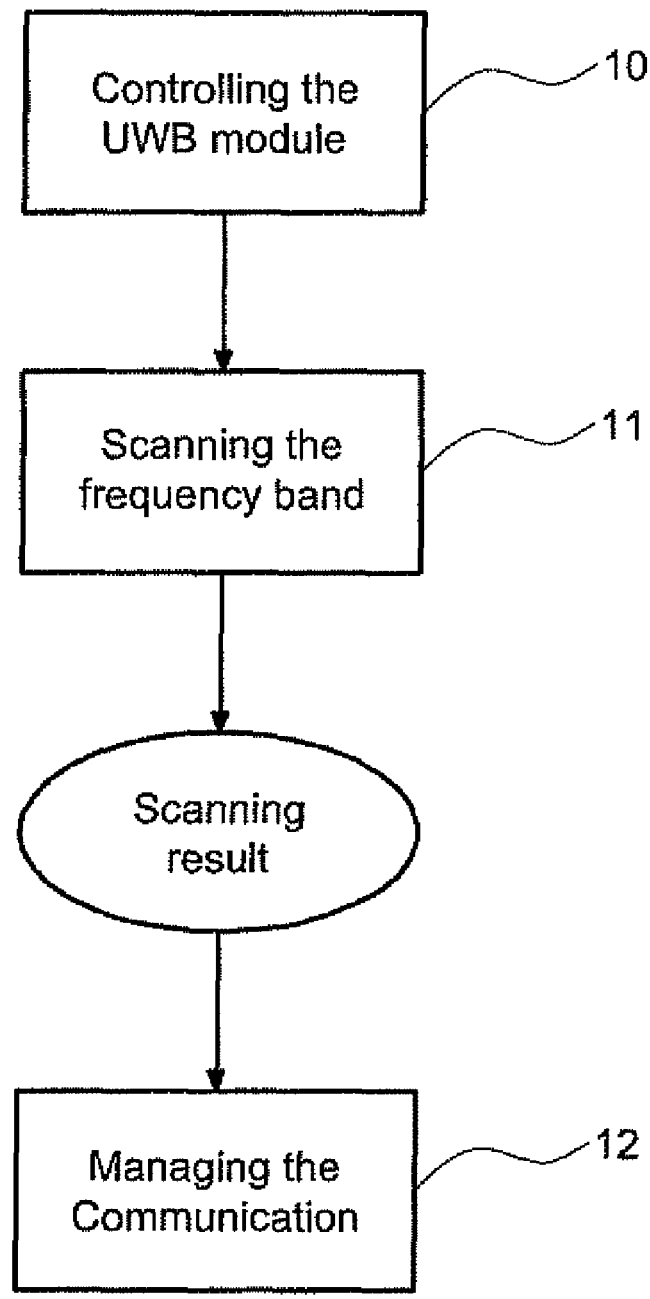
FIGS. 1-3 are block diagrams illustrating flowcharts related to several embodiments of a method of managing the operation of a wireless communication device in accordance with features of the present invention.
Figure 5:
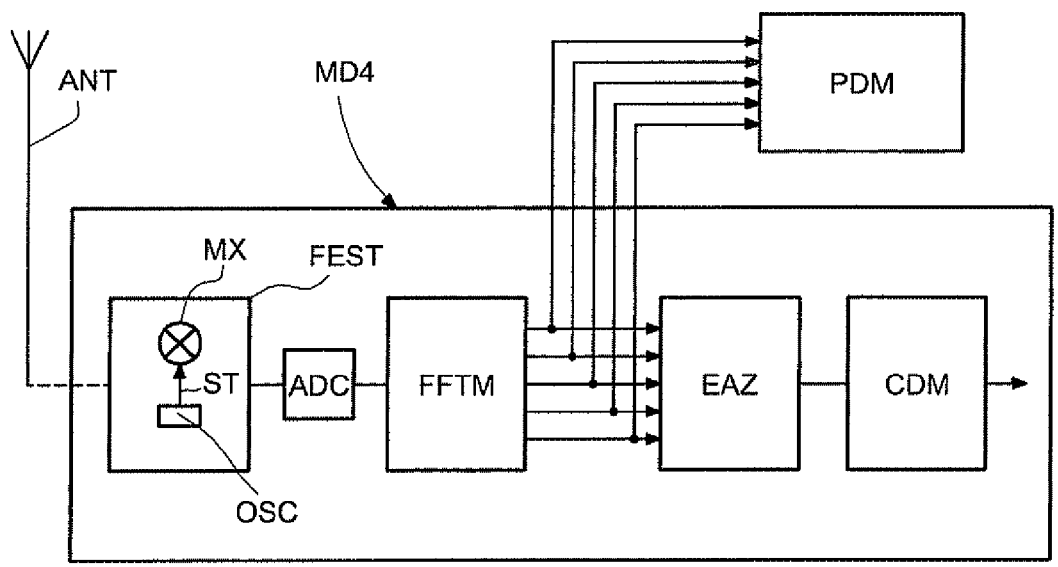

In addition to its conventional communication function, if actually used, the UWB module MD4 is further used for performing a scanning function. More precisely, as illustrated in FIG. 1, in step 10, the UWB module is controlled by controller or control means CTLM to perform a scan of a given frequency band (step 11) or frequency band of interest. Then, the scanning result is used for managing the communication (step 12) of the wireless device WD. As illustrated in FIG. 5, such an OFDM based UWB module is particularly interesting because it is a low cost module and because it is already provided with a first block or means FFTM which are adapted to perform a Fast Fourier Transform.

The UWB module comprises an UWB MAC layer clocked by a clock signal and connected to a PHY layer and to a UWB application block. For further details concerning the MAC layer and the PHY layer, those skilled in the art may refer to the High Rate Ultra Wideband PHY and MAC Standard, Standard ECMA-368, 1$^{st}$ edition, December 2005, and to the MAC-PHY Interface for ECMA-368, Standard ECMA-369, 1$^{st}$ edition, December 2005.

The MAC layer manages in particular the emission/reception of the UWB data stream and may be incorporated by software in a control processor. More precisely, within the MAC layer and/or the PHY layer, as illustrated in FIG. 5, the module MD4 comprises a front end stage FEST including a transposition block or means (for example mixer stage MIX) receiving a transposition signal ST having a frequency transposition, from an oscillator or means OSC for example. The front end stage FEST is connected to a digital processing stage by an analog to digital convertor ADC.

A digital processing stage, performing a base band processing, includes the first block or means FFTM as well as an equalization block or means EAZ followed by a channel decoder or decoding means CDM followed by a source decoder or decoding means (not represented here for simplification reasons). The means may, for example, be incorporated by software within a digital signal processor.

Orthogonal Frequency Division Multiplexing (OFDM) is a method of digital modulation in which the signal is split into several narrow band channels (sub-carriers) at different frequencies. Each output of the first block FFTM corresponds to such a sub carrier. The usual band of frequency used for the operation (transmission and/or reception) of the OFDM based UWB module MD4 lies between 3.1 GHz and 4.9 GHz. Further, this frequency band is divided into three sub-bands called "hopping sub-bands" which are mutually spaced.

More precisely, there is a guard interval of 100 MHz between the lower limit (3.1 GHz) of the frequency band and the beginning of the first sub-band as well as between the end of the third sub-band and the upper limit (4.9 GHz) of the frequency band. Further, two adjacent sub-bands are spaced by a guard interval of 50 MHz. The width of each sub-band is equal to 500 MHz. The allocation of the sub-band during the transmission is made according to a predetermined hopping sequence.

Thus, because such a UWB module is a very broad band receiving module, a large frequency band can be scanned. Further, the complete band can be scanned in parallel with a resolution which is equal to the sub-carrier bandwidth of the OFDM base UWB protocol.

More precisely, a second block or means, for example Peak Detection Means PDM, having a structure known per se to those skilled in the art, can be connected to the output of the first block FFTM to determine the eventual energy peaks of the frequencies corresponding to the several sub-carriers. The sensitivity can be increased by averaging more than one sample. Of course, the frequency band which can be scanned, can be broader than the frequency band 3.1-4.9 GHz, by adjusting accordingly the frequency transposition of the transposition signal ST provided by the local oscillator OSC.

Although the peak detection mean PDM may be realized by hardware or software outside of the module MD4, they may be also realized by software within the base band processor of the module MD4. For performing the scanning operation, the controller or means CTLM may activate the peak detection mean PDM. The scanning result comprises, for example, characteristic time and frequency patterns for example energy peaks at different frequencies, which permit identification of, with a very high time resolution, the different system to be observed.

Figure 2:
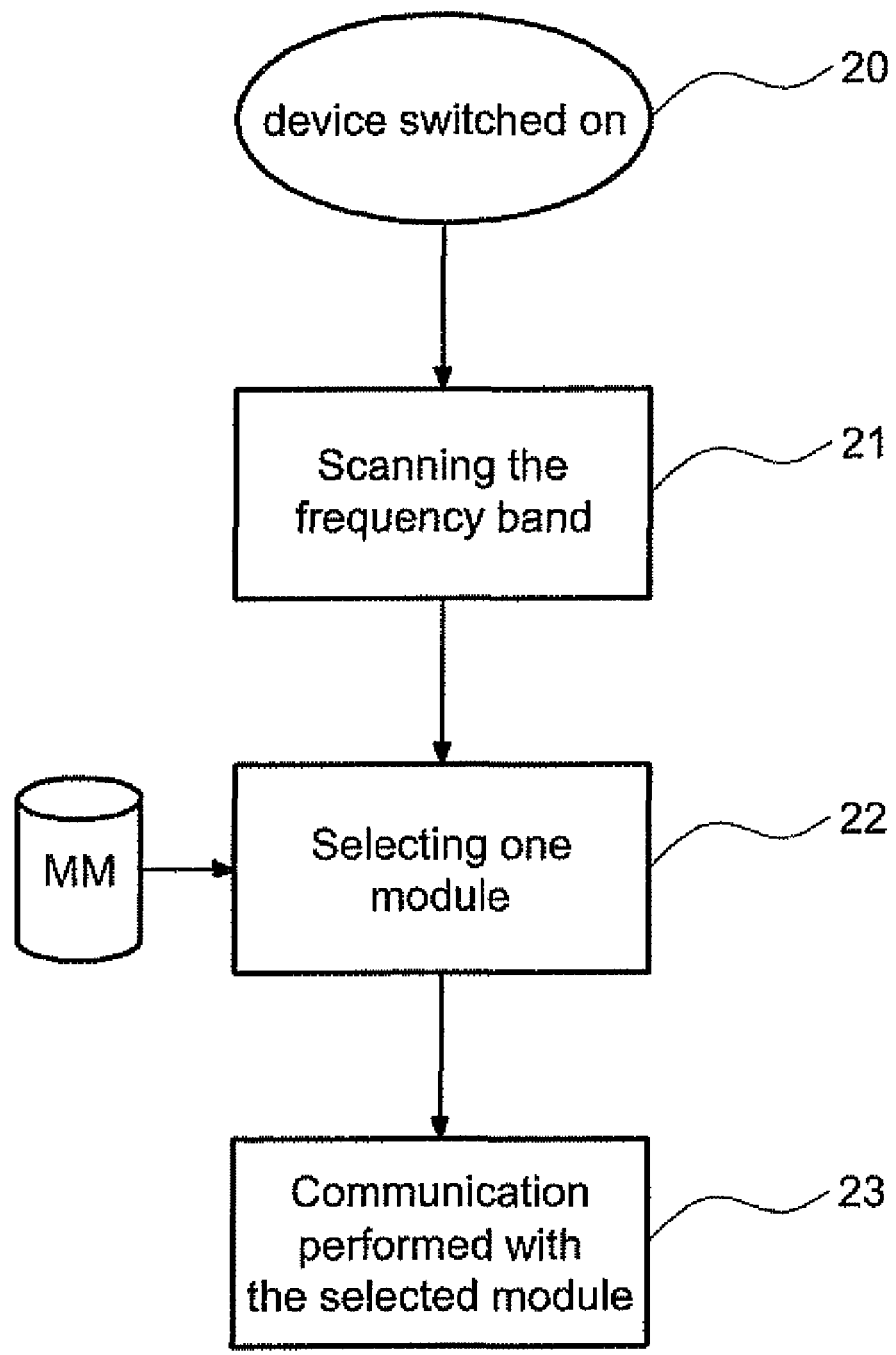

The communication managing mentioned in step 12 of FIG. 1 is a general approach. For example, this managing step may comprise selecting one module (step 22 of FIG. 2). More precisely, when for example the device is switched on (step 20), the frequency band of interest is scanned (step 21) and the scanning result is compared with reference information stored in memory means MM for deciding which module is to be selected for performing the communication (step 23). The reference information may comprise for example TX power, bandwidth, priority, time profile, interoperability modes, etc. . . . of the possible wireless systems operating in the area and the frequency range of interest.

The comparison of the scanning result with the content of the memory means MM is performed by the comparison means CMP and selection means SLM selects one of the module MD1-MD4. These means, incorporated in management means MGM, maybe for example incorporated by software within a controller.

Figure 3:
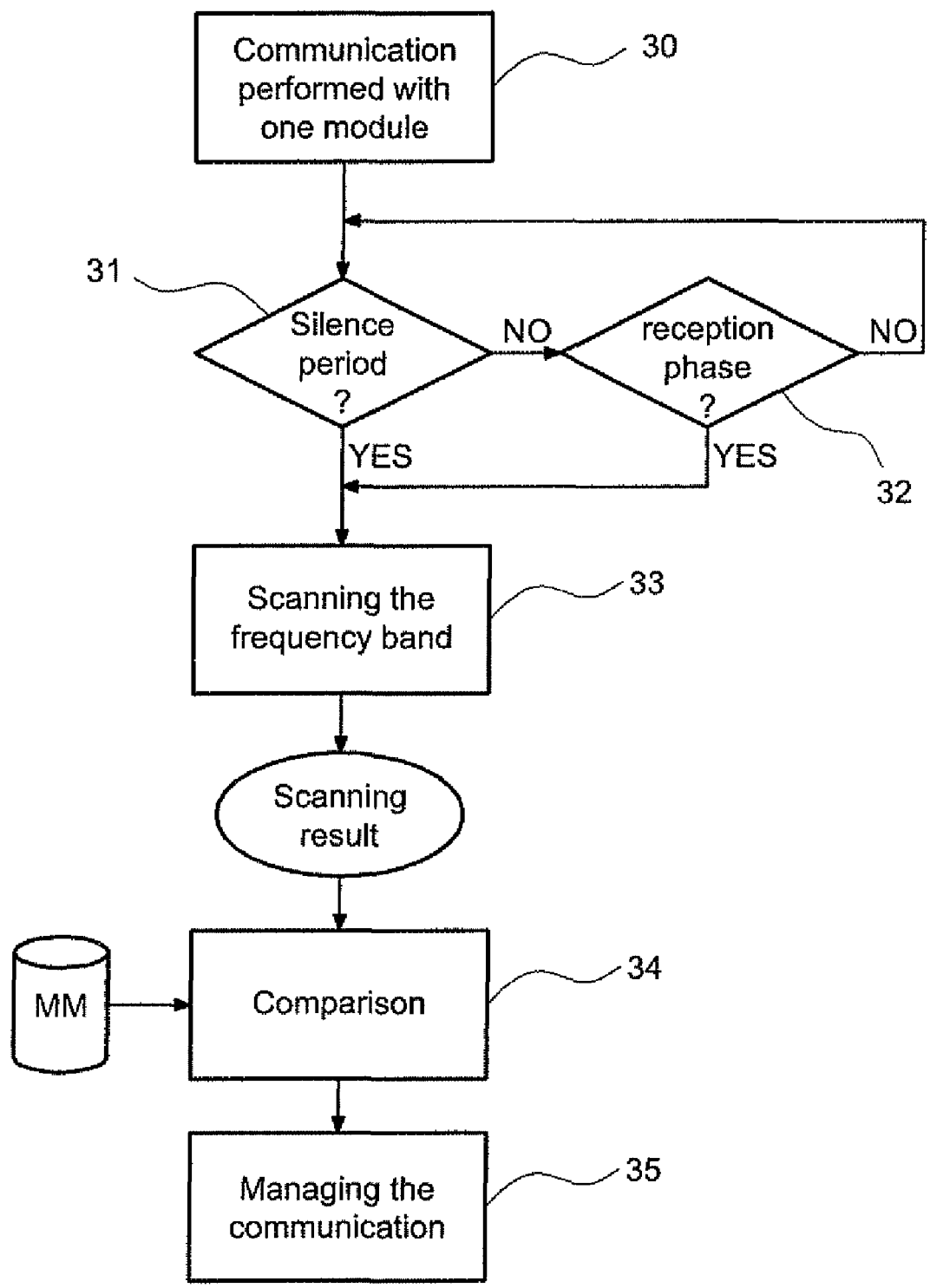

According to another embodiment, illustrated in FIG. 3, it is assumed that a communication is already performed with one module (step 30). The scan of the frequency band performed by the UWB module (step 33) maybe performed during silence periods of the communication protocol being used or during eventually a reception phase. These two conditions are checked in steps 31 and 32. Thus, the scan of the frequency band maybe performed simultaneously or quasi-simultaneously with the communication phase of the module being used; such a module maybe of course the UWB module itself.

The scanning result is then compared (step 34) with the content of the memory means and the communication is managed (step 35) according to operation management information OPMIF elaborated by management control means MCTLM depending on the result of the comparison. For example, this operation management information maybe an indication of the location of a new base station or the presence of a new communication system corresponding to another module of the device. Thus, the management control means maybe select another module or keep the module being used but with another base station. This permits, for example, to speed up a hand over procedure.

Other variants are possible. The result of the scanning process is a frequency map of the possible operational range of the multistandard device containing several wireless interfaces or modules. This frequency map can also be used to manage the communication by establishing a presently non-standardized communication between another device or set of devices using the free spectrum. Thus the device or set of devices can reuse the non-occupied band, the spectrum usage being thus increased.

The UWB module can be used for performing such a non standardized communication, for example by adding an additional control block in the MAC layer.

That which is claimed:

1. A method of managing the operation of a wireless communication device including several different communication modules respectively adapted to operate according to several given communication protocols including an Ultra Wide Band (UWB) module operating according to an UWB protocol based on an OFDM modulation scheme, the method comprising:
   controlling the UWB module to scan a selected frequency band and produce a scanning result; and
   managing a communication to be performed by the wireless communication device on the basis of the scanning result.

2. The method according to claim 1, wherein the scan is performed after the device is switched on.

3. The method according to claim 1, wherein the scan is performed during at least one silence period of one of the communication protocols associated with one of the communication modules being used for performing the communication.

4. The method according to claim 1, wherein the scan is performed during a reception phase of one of the communication protocols associated with one of the communication modules being used for performing the communication.

5. The method according to claim 1, wherein the managing comprises selecting one of the modules for performing the communication.

6. The method according to claim 1, wherein the managing comprises:
   elaborating operation management information from the scanning result and from reference information related to the communication protocols respectively associated to the modules; and
   managing operation of the module being used for the communication based upon the operation management information.

7. A wireless communication device comprising:
   a plurality of different communication modules respectively adapted to operate according to several given communication protocols including an Ultra Wide Band (UWB) communication module adapted to operate according to a UWB protocol based on an OFDM modulation scheme;
   a controller to control the UWB module for scanning a chosen frequency band and produce a scanning result; and
   a management unit to manage a communication to be performed by the device on the basis of the scanning result.

8. The wireless communication device according to claim 7, wherein the controller is adapted to control the UWB module for performing the scan after the device is switched on.

9. The wireless communication device according to claim 7, wherein the controller is adapted to control the UWB module for performing the scan during at least one silence period of one of the communication protocols associated to one of the communication modules being used for performing the communication.

10. The wireless communication device according to claim 7, wherein the controller is adapted to control the UWB module for performing the scan during a reception phase of one of the communication protocols associated to one of the communication modules being used for performing the communication.

11. The wireless communication device according to claim 7, wherein the management unit comprises a selection unit to select one of the modules for performing the communication.

12. The wireless communication device according to claim 7, further comprising:
   a memory to store reference information related to the communication protocols respectively associated to the modules;
   wherein the management unit comprises
      a comparison block adapted to compare the scanning result with the reference information, and
      a management controller adapted to manage the communication on the basis of the comparison result.

13. The wireless communication device according to claim 7, wherein the UWB module comprises a front end stage and a first block coupled to the front end stage and adapted to perform a Fast Fourier Transform; wherein the device further comprises a second block controllably coupled to outputs of the first transform block and adapted to deliver energy information respectively associated to the frequencies respectively corresponding to the outputs of the first transform block; and wherein the controller is adapted to activate the second block.

14. The wireless communication device according to claim 13, wherein the front end stage comprises:
   a frequency transposition unit; and
   a controllable local oscillator adapted to deliver a transposition signal having a transposition frequency to the frequency transposition unit;
   the controller being adapted to control the local oscillator for modifying the transposition frequency in accordance with the chosen frequency band to be scanned.

15. A wireless communication device comprising:
a plurality of different communication modules respectively adapted to operate according to several given communication protocols including an Ultra Wide Band (UWB) communication module adapted to operate according to a UWB protocol based on an OFDM modulation scheme;
a control means for controlling the UWB module for scanning a chosen frequency band and producing a scanning result; and
a management means for managing a communication to be performed by the device on the basis of the scanning result.

16. The wireless communication device according to claim 15, wherein the control means is adapted to control the UWB module for performing the scan after the device is switched on.

17. The wireless communication device according to claim 15, wherein the control means is adapted to control the UWB module for performing the scan during at least one silence period of one of the communication protocols associated to one of the communication modules being used for performing the communication.

18. The wireless communication device according to claim 15, wherein the control means is adapted to control the UWB module for performing the scan during a reception phase of one of the communication protocols associated to one of the communication modules being used for performing the communication.

19. The wireless communication device according to claim 15, wherein the management means comprises selection means for selecting one of the modules for performing the communication.

20. The wireless communication device according to claim 15, further comprising:
memory means for storing reference information related to the communication protocols respectively associated to the modules;
wherein the management means comprises
comparison means for comparing the scanning result with the reference information, and
management control means for managing the communication on the basis of the comparison result.

21. The wireless communication device according to claim 15, wherein the UWB module comprises a front end stage and a first means coupled to the front end stage and for performing a Fast Fourier Transform; wherein the device further comprises a second means controllably coupled to outputs of the first means for delivering energy information respectively associated to the frequencies respectively corresponding to the outputs of the first means; and wherein the controller is adapted to activate the second means.

22. The wireless communication device according to claim 21, wherein the front end stage comprises:
a frequency transposition means; and
a controllable local oscillator adapted to deliver a transposition signal having a transposition frequency to the frequency transposition means;
the control means being adapted to control the local oscillator for modifying the transposition frequency in accordance with the chosen frequency band to be scanned.

* * * * *